US012645987B2

(12) United States Patent
Chou et al.

(10) Patent No.: US 12,645,987 B2
(45) Date of Patent: Jun. 2, 2026

(54) METHODS AND MECHANISMS FOR MEASURING PATTERNED SUBSTRATE PROPERTIES DURING SUBSTRATE MANUFACTURING

(71) Applicant: Applied Materials, Inc., Santa Clara, CA (US)

(72) Inventors: Ping-Yu Chou, Hsinchu (TW); Ya-Chu Chang, Hsinchu (TW); Jui-Che Lin, Hsinchu (TW); Hao-Wei Peng, Hsinchu (TW); Chao-Hsien Lee, Hsinchu (TW); Shauh-Teh Juang, Hsinchu (TW)

(73) Assignee: Applied Materials, Inc., Santa Clara, CA (US)

( * ) Notice: Subject to any disclaimer, the term of this patent is extended or adjusted under 35 U.S.C. 154(b) by 1105 days.

(21) Appl. No.: 17/704,298

(22) Filed: Mar. 25, 2022

(65) Prior Publication Data

US 2023/0306300 A1     Sep. 28, 2023

(51) Int. Cl.
*G06N 20/00*          (2019.01)
(52) U.S. Cl.
CPC ................................... *G06N 20/00* (2019.01)
(58) Field of Classification Search
CPC .................................................... G06N 20/00
See application file for complete search history.

(56) References Cited

U.S. PATENT DOCUMENTS

2002/0155788 A1* 10/2002 Bibby, Jr. ............... B24B 49/04
451/6

OTHER PUBLICATIONS

Kang, Seokho. "On effectiveness of transfer learning approach for neural network-based virtual metrology modeling." IEEE Transactions on Semiconductor Manufacturing 31, No. 1 (2017): 149-155. (Year: 2017).*
Lenz, Benjamin, Bernd Barak, Julia Mührwald, and Carolin Leicht. "Virtual metrology in semiconductor manufacturing by means of predictive machine learning models." In 2013 12th international conference on machine learning and applications, vol. 2, pp. 174-177. IEEE, 2013. (Year: 2013).*
Ferreira, Ariane, Agnès Roussy, Christelle Kernaflen, Dietmar Gleispach, Günter Hayderer, Hervé Gris, and Jérôme Besnard. "Virtual metrology models for predicting avera PECVD oxide film thickne." In 2011 IEEE/SEMI Advanced Semiconductor Manufacturing Conference, pp. 1-6. IEEE, 2011. (Year: 2011).*

(Continued)

*Primary Examiner* — Casey R. Garner
(74) *Attorney, Agent, or Firm* — Lowenstein Sandler LLP

(57)          ABSTRACT

An electronic device manufacturing system configured to obtain sensor data associated with a deposition process performed in a process chamber to deposit a film stack on a surface of a substrate. The film stack can include a known film pattern and an unknown film pattern. The manufacturing system is further configured to input the sensor data into a first trained machine-learning model to obtain a first output value of the first trained machine-learning model. The first output value can be associated with the known film pattern. The manufacturing system is further configured to input the first output value into a second trained machine-learning model to obtain a second output value of the second trained machine-learning model. The second output value can be indicative of metrology data of the known film pattern.

17 Claims, 11 Drawing Sheets

(56)         References Cited

OTHER PUBLICATIONS

Rad et al, "Feature Mapping for Learning Fast and Accurate 3D Pose Inference from Synthetic Images", Institute for Computer Graphics and Vision, Graz University of Technology, Graz, Austria, Laboratoire Bordelais de Recherche en Informatique, Universit'e de Bordeaux, Bordeaux, France, Mar. 26, 2018, 14 pages.

* cited by examiner

100

Predictive System 110

Server Machine 170

Training Set Generator 172

Server Machine 180

Training Engine 182

Validation Engine 184

Selection Engine 185

Testing Engine 186

Model 190

Model 192

Predictive Server 112

Predictive Component 114

Data Store 140

Unpatterned Reflectance Data 142

Patterned Reflectance Data 144

Network 130

Manufacturing Equipment 124

Sensors 126

Client Device 120

Corrective Action Component 122

Metrology Equipment 128

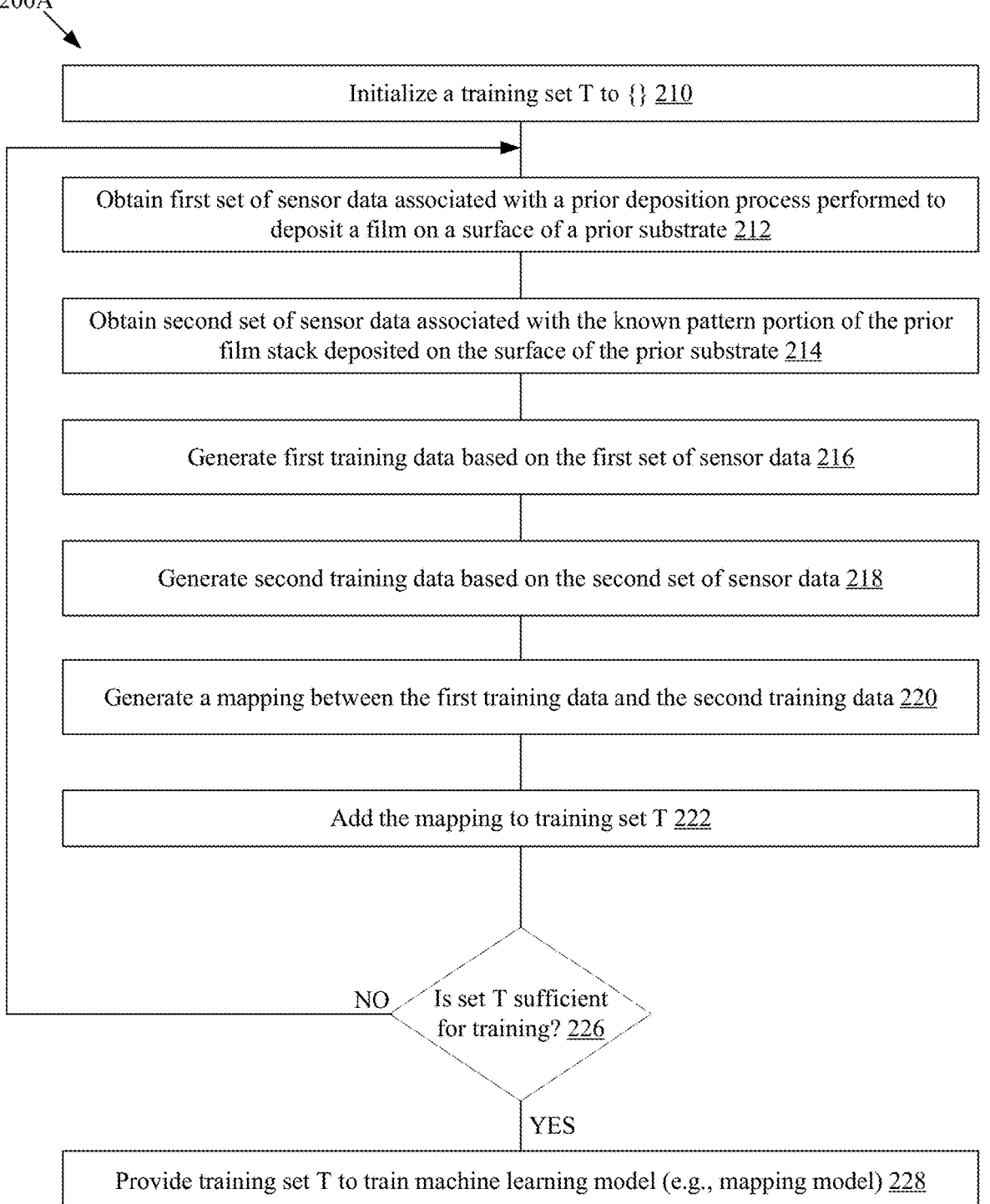

Initialize a training set T to {} 210

Obtain first set of sensor data associated with a prior deposition process performed to deposit a film on a surface of a prior substrate 212

Obtain second set of sensor data associated with the known pattern portion of the prior film stack deposited on the surface of the prior substrate 214

Generate first training data based on the first set of sensor data 216

Generate second training data based on the second set of sensor data 218

Generate a mapping between the first training data and the second training data 220

Add the mapping to training set T 222

Is set T sufficient for training? 226

NO

YES

Provide training set T to train machine learning model (e.g., mapping model) 228

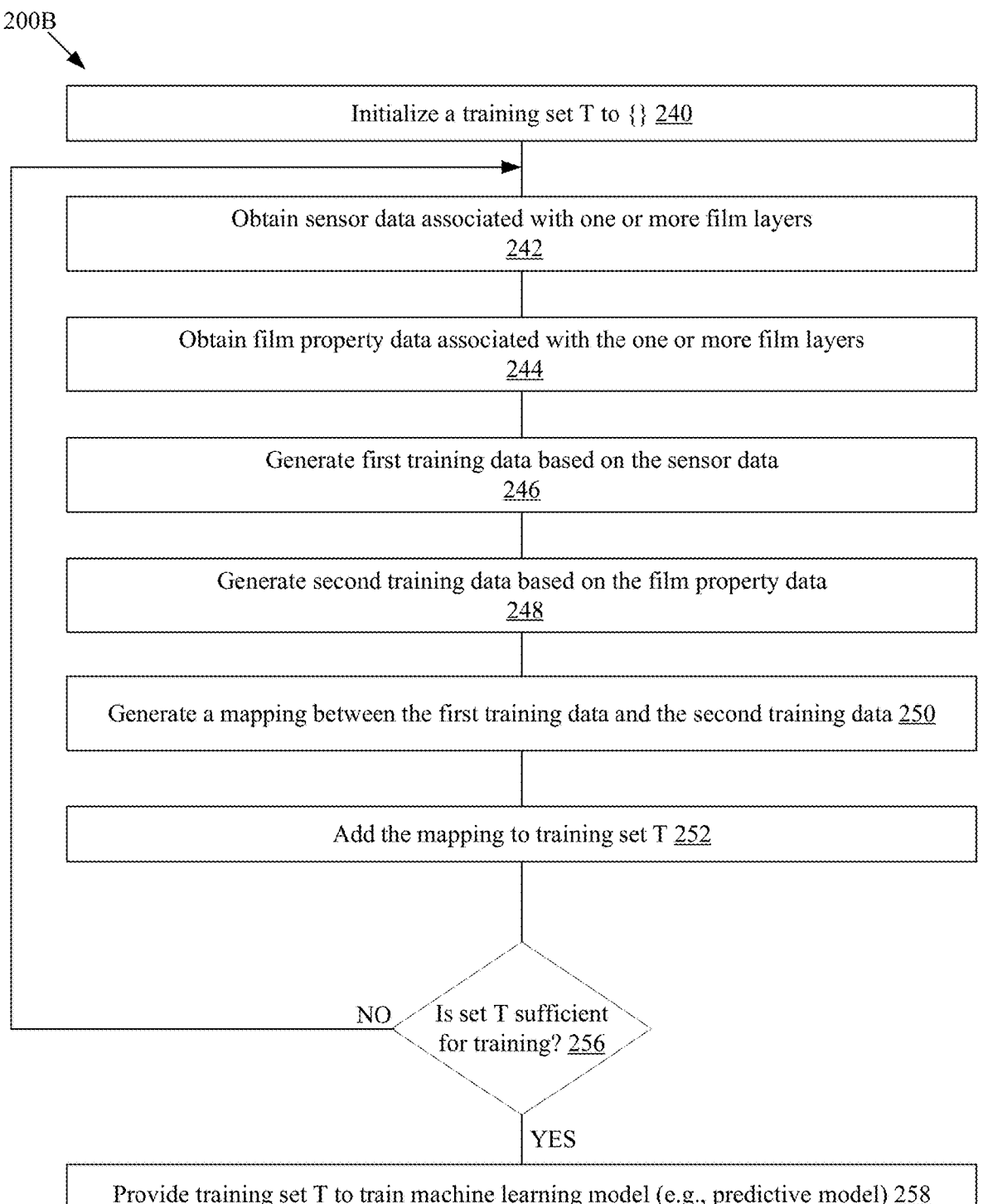

Initialize a training set T to {} 240

Obtain sensor data associated with one or more film layers
242

Obtain film property data associated with the one or more film layers
244

Generate first training data based on the sensor data
246

Generate second training data based on the film property data
248

Generate a mapping between the first training data and the second training data 250

Add the mapping to training set T 252

NO    Is set T sufficient for training? 256

YES

Provide training set T to train machine learning model (e.g., predictive model) 258

FIG. 2B

SYSTEM CONTROLLER 328

DATA STORE 350

Predictive
Metrology
Data
660

Predictive Model
192

650

Known material 1
Known material 2
Known material 3

190A
Mapping model 1

190B
Mapping model 2

190C
Mapping model 3

680

700
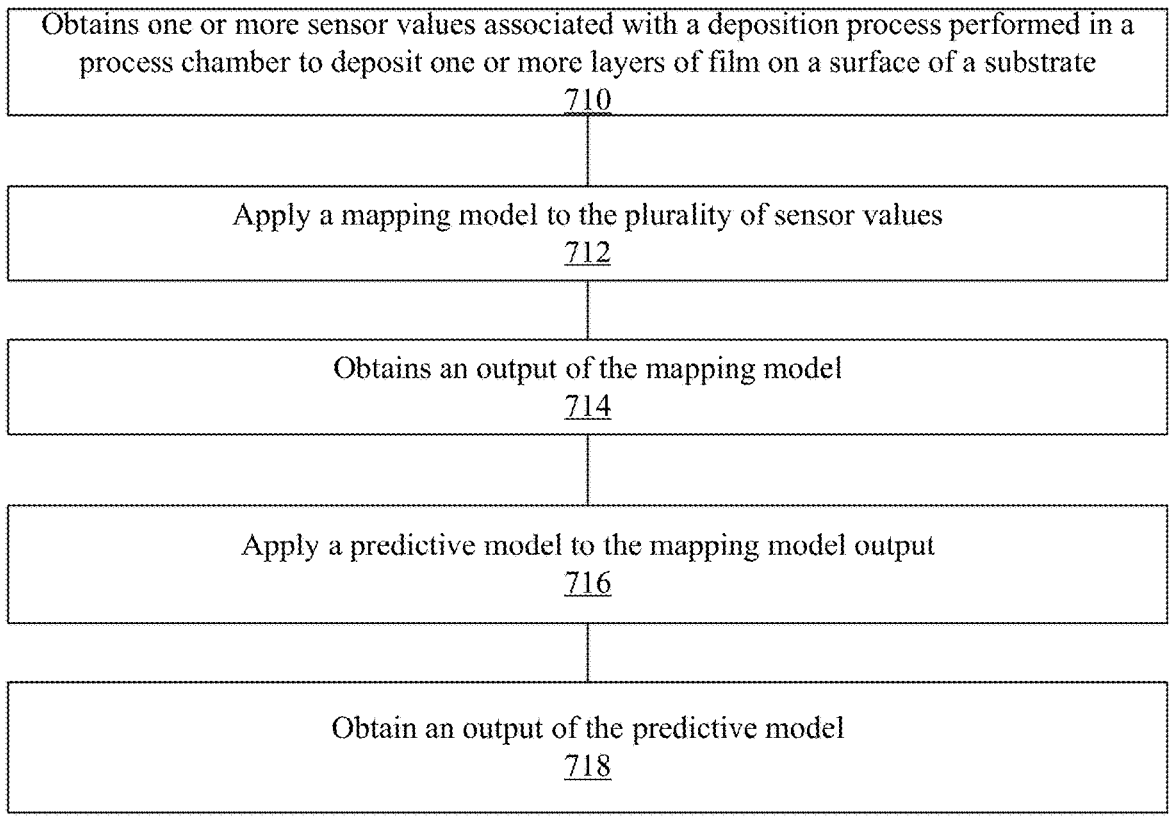
Obtains one or more sensor values associated with a deposition process performed in a process chamber to deposit one or more layers of film on a surface of a substrate
710
Apply a mapping model to the plurality of sensor values
712
Obtains an output of the mapping model
714
Apply a predictive model to the mapping model output
716
Obtain an output of the predictive model
718
FIG. 7

800

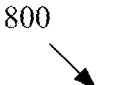

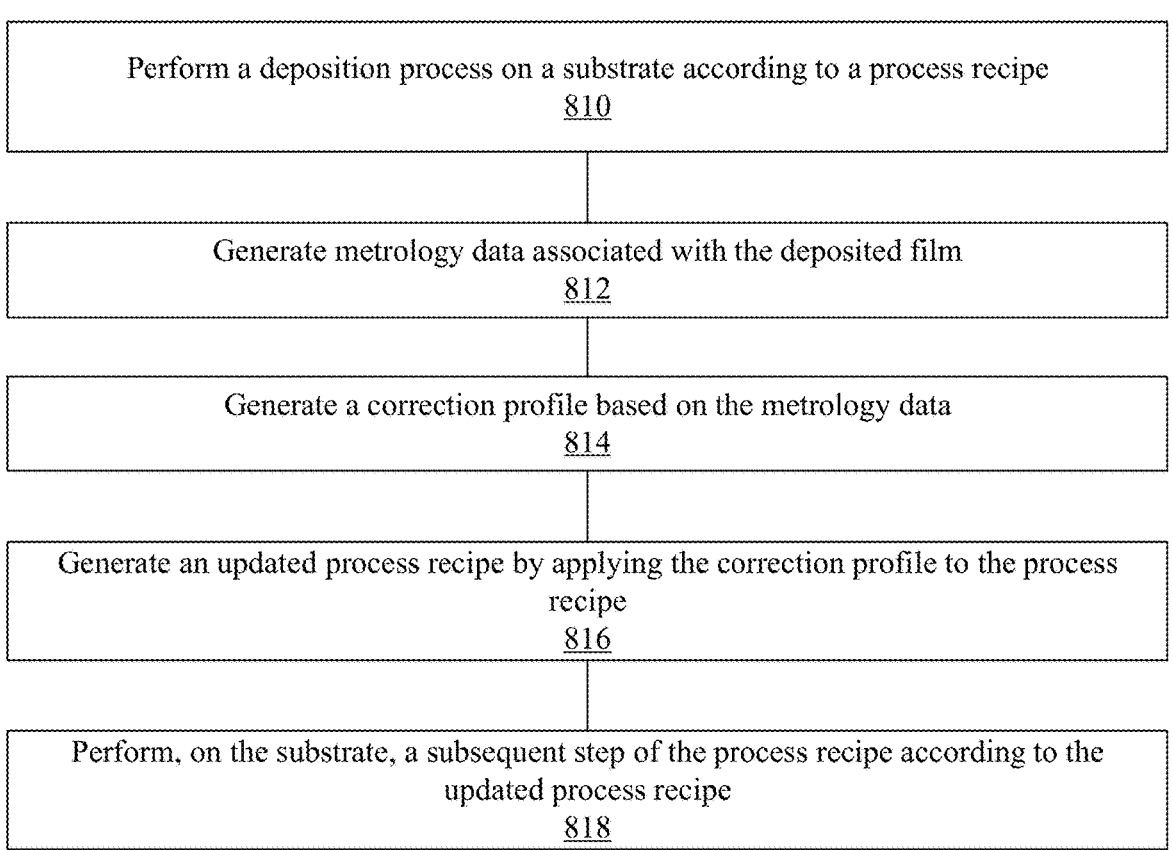

> Perform a deposition process on a substrate according to a process recipe
> 810

> Generate metrology data associated with the deposited film
> 812

> Generate a correction profile based on the metrology data
> 814

> Generate an updated process recipe by applying the correction profile to the process recipe
> 816

> Perform, on the substrate, a subsequent step of the process recipe according to the updated process recipe
> 818

FIG. 8

METHODS AND MECHANISMS FOR MEASURING PATTERNED SUBSTRATE PROPERTIES DURING SUBSTRATE MANUFACTURING

TECHNICAL FIELD

The present disclosure relates to electrical components, and, more particularly, to methods and mechanisms for measuring patterned substrate properties during substrate manufacturing.

BACKGROUND

Products can be produced by performing one or more manufacturing processes using manufacturing equipment. For example, semiconductor manufacturing equipment can be used to produce semiconductor devices (e.g., substrates) via semiconductor manufacturing processes. The manufacturing equipment can, according to a process recipe, deposit multiple layers of film on the surface of the substrate and can perform an etch process to form the intricate pattern in the deposited film. For example, the manufacturing equipment can perform a chemical vapor deposition (CVD) process to deposit alternative layers on the substrate. Sensors can be used to determine manufacturing parameters of the manufacturing equipment during the manufacturing processes and metrology equipment can be used to determine property data of the products that were produced by the manufacturing equipment, such as the overall thickness of the layers on the substrate. Generally, the metrology equipment cannot measure the thickness of individual layers on the substrate (e.g., the thickness of each oxide and each nitride layer) until the manufacturing process is completed, and not without using a destructive testing process such as a Transmission Electron Microscope (TEM) analysis. Machine learning models can be trained to predict the thickness of individual layers. However, such systems require large amounts of data sets for training the machine learning model, which may not be feasible. Therefore, a system capable of generating machine learning models using fewer training sets is desirable.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, an electronic device manufacturing system includes a process chamber, metrology equipment, and predictive system. The manufacturing system is configured to obtain, by a processor, sensor data associated with a deposition process performed in a process chamber to deposit a film stack on a surface of a substrate. The film stack can include a known film pattern and an unknown film pattern. The manufacturing system is further configured to input the sensor data into a first trained machine-learning model to obtain a first output value of the first trained machine-learning model. The first output value can be associated with the known film pattern. The manufacturing system is further configured to input the first output value into a second trained machine-learning model to obtain a second output value of the second trained machine-learning model. The second output value can be indicative of metrology data of the known film pattern.

A further aspect of the disclosure includes a method according to any aspect or embodiment described herein.

A further aspect of the disclosure includes a non-transitory computer-readable storage medium comprising instructions that, when executed by a processing device operatively coupled to a memory, performs operations according to any aspect or embodiment described herein.

BRIEF DESCRIPTION OF THE DRAWINGS

The present disclosure is illustrated by way of example, and not by way of limitation in the figures of the accompanying drawings.

FIG. 1 is a block diagram illustrating an example system architecture, according to certain embodiments.

FIG. 2A is a flow diagram of a method for training a mapping machine-learning model, according to certain embodiments.

FIG. 2B is a flow diagram of a method for training a predictive machine-learning model, according to certain embodiments.

FIG. 3 is a top schematic view of an example manufacturing system, according to certain embodiments.

FIG. 7 is a flow diagram of a method for determining predictive metrology data for layers of a film using a mapping model and a predictive model, according to certain embodiments.

FIG. 8 is a flow diagram of a method for determining a correction profile for a process recipe, according to certain embodiments.

DETAILED DESCRIPTION

Figure 4:
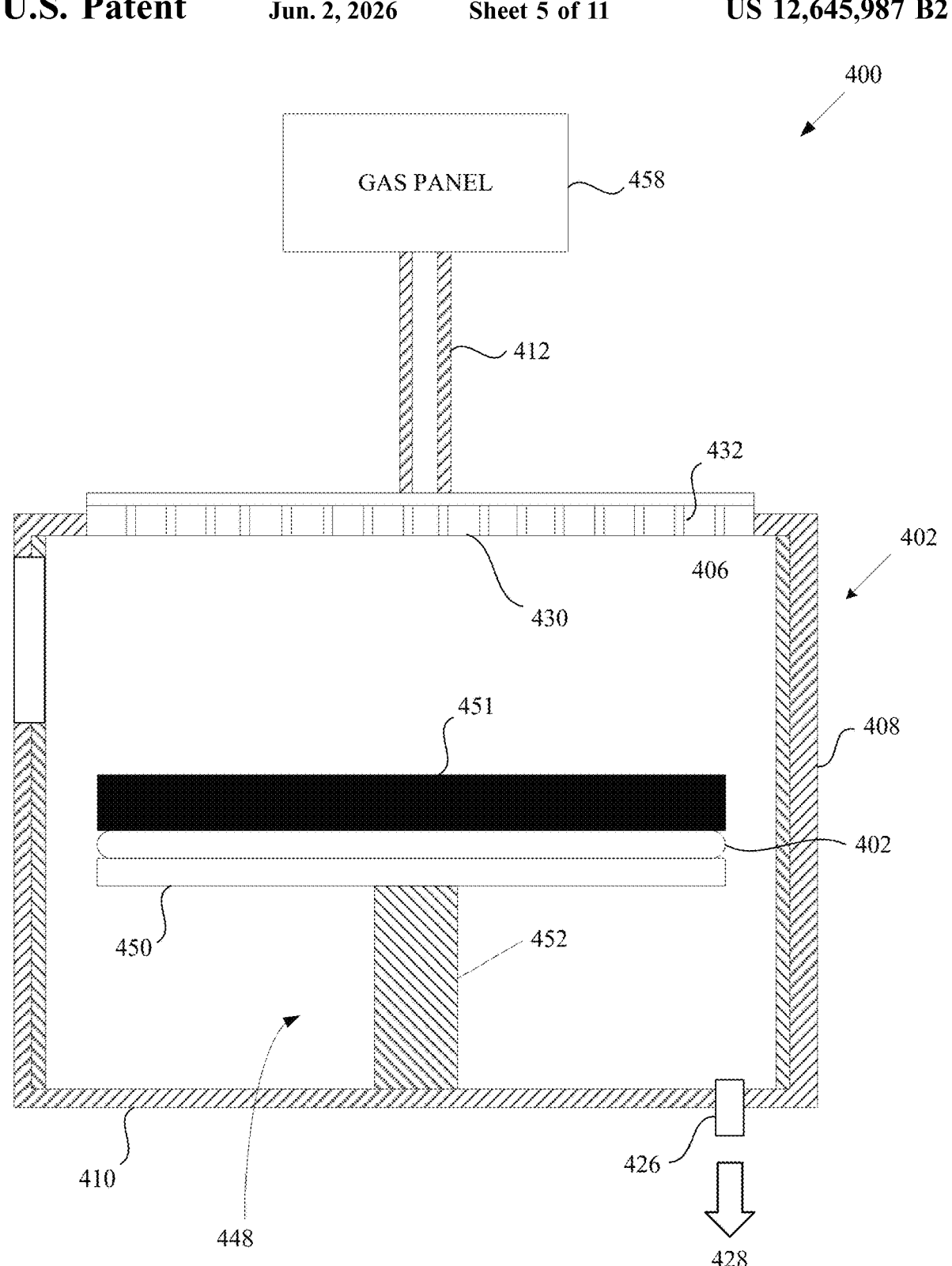
FIG. 4 is a cross-sectional schematic side view of an example process chamber of the example manufacturing system, according to certain embodiments.

Described herein are technologies directed to methods and mechanisms for measuring patterned substrate properties during substrate manufacturing. A film can be deposited on a surface of a substrate during a deposition process (e.g., a deposition (CVD) process, an atomic layer deposition (ALD) process, and so forth) performed at a process chamber of a manufacturing system. For example, in a CVD process, the substrate is exposed to one or more precursors, which react on the substrate surface to produce the desired deposit. The film can include one or more layers of materials that are formed during the deposition process, and each layer can include a particular thickness gradient (e.g., changes in the thickness along a layer of the deposited film). For example, a first layer can be formed directly on the surface of the substrate (referred to as a proximal layer or proximal end of the film) and have a first thickness. After the first layer is formed on the surface of the substrate, a second layer having a second thickness can be formed on the first layer. This process continues until the deposition process is completed and a final layer is formed for the film (referred to as the distal layer or distal end of the film). The film can include alternating layers of different materials. For example, the film can include alternating layers of oxide and nitride layers (oxide-nitride-oxide-nitride stack or ONON stack), alternating oxide and polysilicon layers (oxide-polysilicon-oxide-polysilicon stack or OPOP stack), and so forth.

The film can be subjected to, for example, an etch process to form a pattern on the surface of the substrate, a chemical-mechanical polishing (CMP) process to smooth the surface of the film, or any other process necessary to manufacture the finished substrate. An etch process can include exposing highly energetic process gas (e.g., a plasma) with a sample surface to break down the materials at the surface, which can then be removed by a vacuum system.

A process chamber can perform each substrate manufacturing process (e.g., the deposition process, the etch process, the polishing process, etc.) according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc. Accordingly, the thickness of each film layer can be correlated to these process chamber settings.

In some existing systems, metrology measurements are performed on substrates of a batch to generate metrology data, such as thickness data. For example, metrology equipment can analyze a substrate to determine the thickness of each layer in the film stack. Using the metrology data, the systems can perform quality control by adjusting a deposition rate of one or more layers to decrease defects and improve layer uniformity. This is important because a defect or small variation in layer thickness can result in a large deviation at the top of a film stack. However, most existing systems cannot measure the thickness of individual layers on the substrate until the film stack is completed, and not without using destructive testing processes to obtain metrology data for each layer in the film stack.

Some existing systems can use less destructive processes to determine film thickness, such as reflectometry techniques (e.g., emitting and analyzing pulses reflected from the film). For example, some systems can use a machine learning model to predict the thickness of a film layer(s) using the reflectance properties of the film stack. However, many recipes include a known film pattern and an unknown film pattern. An unknown pattern can reference a portion of a film stack whose film properties (e.g., number of layers, the thickness of each layer, the material of each layer, etc.) are unknown. For example, the film properties of a set of layers deposited on a substrate may be proprietary, and not be made available when training a machine learning model. As such, generating a machine learning model to predict substrate properties using reflectance requires large amounts of training data, which is expensive, time consuming, and not feasible for recipes having relatively short production runs.

Aspects and implementations of the present disclosure address these and other shortcomings of the existing technology by training machine-learning models capable of generating predictive metrology data using reflectance data. In particular, a predictive system can train two machine learning models for generating predictive data; a mapping model and a predictive model. The mapping model be used to receive, as input data, reflectance data of a patterned substrate (e.g., a substrate having a known film pattern and an unknown film pattern) and generate, as output data, unpatterned reflectance data (e.g., reflectance data of only the known film pattern). As such, the mapping model can be used to remove or account for the unknown pattern from real-time reflectance data. In one example, the mapping model be trained using datasets that map reflectance data from a patterned film stack having a known pattern and an unknown pattern to reflectance data of an unpatterned film stack having only the known pattern. A known pattern can reference a portion of a film stack whose film properties (e.g., number of layers, the thickness of each layer, the material of each layer, etc.) are known. For example, a film stack can have an unknown pattern deposited onto the substrate, then a set of layers having a known pattern (e.g., 10 sets of alternating layers of oxide and nitride layers of a first and second thickness, respectively). The predictive system can train the mapping model using the datasets of the reflectance data from the patterned film stack mapped to the reflectance data from only the same known pattern. Once trained, the mapping model can receive reflectance data of a patterned substrate and output a value(s) indicative of reflectance data of only the known pattern of the patterned substrate.

The predictive model can receive, as input, the unpatterned reflectance data (e.g., mapping model output data) and generate predictive data. In some embodiments, the predictive data can include thickness data of one or more deposition layers. In some embodiments, the predictive model can be generated based on training data, which includes unpatterned reflectance data mapped to film thickness data. The film thickness data can include measured thickness values obtained from measuring individual layers of material produced by the manufacturing equipment or measured thickness values obtained from measuring film stacks produced by the manufacturing equipment. In some embodiments, the film thickness data can be generated using reflectometry techniques, ellipsometry techniques, a TEM analysis, or any other measurement techniques. In some embodiments, the predictive model can be calibrated using measured metrology data.

In some embodiments, the system of the present disclosure can generate different trained mapping models for different recipes having different unknown patterns. For example, the present system can train a first mapping model to generate unpatterned reflectance data for a first recipe having a first unknown pattern, train a second mapping model to generate unpatterned reflectance data for a second recipe having a second unknown pattern, and so forth. Each of the mapping models can be used with the same predictive model because the predictive model is trained to output thickness data using unpatterned reflectance data as input. Accordingly, by training different mapping models for different recipes, where each mapping model can be used with the same predictive model, the system of the present disclosure produces significant reduction in training time and data required by being capable of using the same predictive model for different recipes having different unknown patterns.

In some embodiments, the unknown pattern of a film stack can have multiple sections of different patterns. For example, one section of the unknown pattern on the film stack can have a first type of etch pattern while another section of the unknown pattern on the film stack can have a second type of etch pattern. Accordingly, in some embodiments, the system of the present disclosure can generate different trained mapping models for different sections of the film stack. Each mapping models can be used to generate unpatterned reflectance data for a corresponding section of the film stack, and the output of each mapping model can be used as input data for the predictive model to generate predictive metrology data (e.g., thickness data).

In some embodiments, metrology equipment can use the optical equipment to obtain reflectance data after the deposition of one or more layers onto a substrate having an unknown pattern. The reflectance data can be input into the mapping model to generate output data indicative of reflectance data of the known pattern of the patterned substrate (unpatterned reflectance data). This output data can then be input into the predictive model to generate output data indicative of the thickness of one or more deposited layers. The metrology equipment can use the output data from the predictive model to generate a thickness profile indicative of one or more thickness values of one or more layers across the surface of the substrate. The thickness profile can indicate the thickness of the film on the substrate, the thickness of a layer of film on the substrate, etc.

The metrology equipment can generate the thickness profiles at different times during the manufacturing process. For example, a first step of a process recipe (e.g., a deposition of one or more layers) can be performed on the substrate and the in-situ metrology equipment (metrology equipment inside a process chamber) can generate a first thickness profile of the substrate. Next, a second step of the process recipe can be performed on the substrate and the in-situ metrology equipment can then generate a second thickness profile of the substrate, and so forth.

The thickness profiles can be used by the manufacturing system to generate a correction profile. The correction profile can include one or more adjustments or offsets (e.g., corrective actions) to be applied to the parameters of the process recipe or the process chamber. For example, the correction profile can include an adjustment to the temperature setting for the process chamber, the pressure setting for the process chamber, the flow rate setting for a precursor for a material included in the film deposited on the substrate surface, to the power supplied to the process chamber, to the ratio of two or more settings, etc. The manufacturing system can generate the correction profiles by determining a difference between an expected profile (e.g., the thickness profile expected to be generated by the process recipe) and the generated thickness profile. For example, the manufacturing system can generate the correction profile by applying an algorithm to the difference and/or looking up the difference in a library of known faults where each difference is associated with a correction profile. The correction profile(s) can be applied to one or more steps of the deposition process, the etch process, etc. In some embodiments, the each correction profile can be applied to subsequent steps of the process recipe upon completion of a current process step. This allows the manufacturing equipment to compensate for deviations that already occurred during manufacturing of the current substrate. In other embodiments, for subsequent substrates, each correction profile can be applied to the process step associated with the metrology data used to generate said correction profile. This allows the manufacturing system to generate adjustments for the manufacturing of subsequent substrates.

Aspects of the present disclosure result in technological advantages of significant reduction in time and data required to train a machine learning model capable of generating predictive metrology data using reflective data of unknown substrate patterns. Aspects of the present disclosure further result in technological advantages of significant reduction in time to detect issues or failures experienced by a substrate during the manufacturing process, as well as improvements in energy consumption, and so forth. The present disclosure can also result in generating diagnostic data and performing corrective actions to avoid inconsistent and abnormal products, and unscheduled user time or down time.

Figure 3:
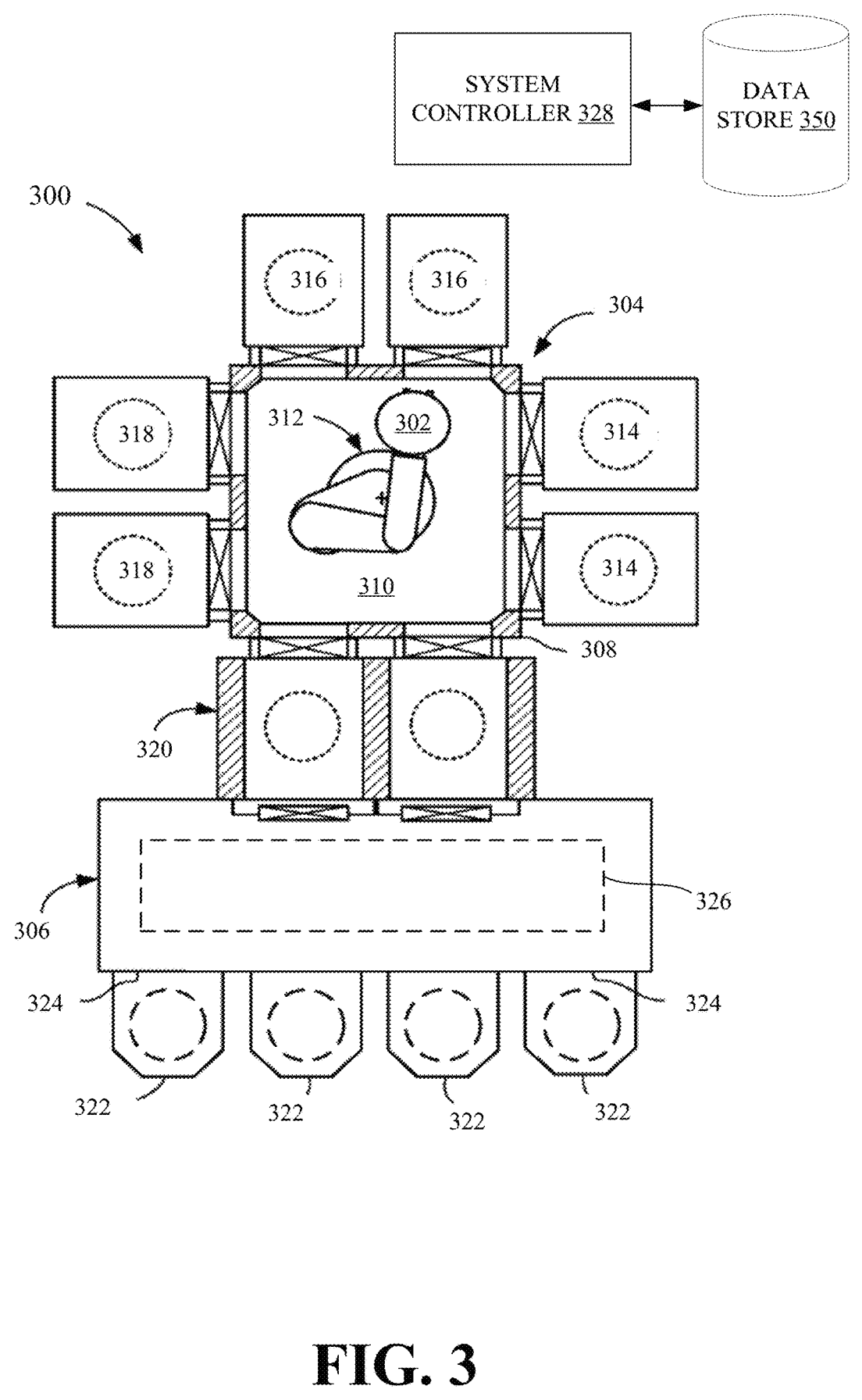

FIG. 1 depicts an illustrative computer system architecture 100, according to aspects of the present disclosure. In some embodiments, computer system architecture 100 can be included as part of a manufacturing system for processing substrates, such as manufacturing system 300 of FIG. 3. Computer system architecture 100 includes a client device 120, manufacturing equipment 124, metrology equipment 128, a predictive server 112 (e.g., to generate predictive data, to provide model adaptation, to use a knowledge base, etc.), and a data store 140. The predictive server 112 can be part of a predictive system 110. The predictive system 110 can further include server machines 170 and 180. The manufacturing equipment 124 can include sensors 126 configured to capture data for a substrate being processed at the manufacturing system. In some embodiments, the manufacturing equipment 124 and sensors 126 can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system).

Manufacturing equipment 124 can produce products, such as electronic devices, following a recipe or performing runs over a period of time. Manufacturing equipment 124 can include a process chamber, such as process chamber 400 described with respect to FIG. 4. Manufacturing equipment 124 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some embodiments, manufacturing equipment 124 includes sensors 126 that are configured to generate data associated with a substrate processed at manufacturing system 100. For example, a process chamber can include one or more sensors configured to generate spectral or non-spectral data associated with the substrate before, during, and/or after a process (e.g., a deposition process) is performed for the substrate. In some embodiments, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include temperature sensors, pressure sensors, flow rate sensors, voltage sensors, etc. Further details regarding manufacturing equipment 124 are provided with respect to FIG. 3 and FIG. 4.

In some embodiments, sensors 126 provide sensor data (e.g., sensor values, features, trace data) associated with manufacturing equipment 124 (e.g., associated with producing, by manufacturing equipment 124, corresponding products, such as wafers). The manufacturing equipment 124 can produce products following a recipe or by performing runs over a period of time. Sensor data received over a period of time (e.g., corresponding to at least part of a recipe or run) can be referred to as trace data (e.g., historical trace data, current trace data, etc.) received from different sensors 126 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

Metrology equipment 128 can provide metrology data associated with substrates processed by manufacturing equipment 124. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

Reflectometry techniques can include time-domain reflectometry (TDR), frequency-domain reflectometry (FDR), ellipsometry, etc. TDF emits a series of fast pulses, and analyzes the magnitude, duration and shape of the reflected pulses. FDR is based on the transmission of a set of stepped-frequency sine waves from the sample. The signal analysis is focused on the changes in frequency between the incident signal and the reflected signal. Ellipsometry includes the polarization-resolved measurement of light reflections from films. As will be explained in greater detail within, the reflectometry techniques can be used to obtain sensor data (e.g., a reflectance value(s)), which can be processed to generate metrology data.

In some embodiments, metrology equipment 128 can be included as part of the manufacturing equipment 124. For example, metrology equipment 128 can be included inside of or coupled to a process chamber and configured to generate metrology data for a substrate before, during, and/or after a process (e.g., a deposition process, an etch process, etc.) while the substrate remains in the process chamber. In some instances, metrology equipment 128 can be referred to as in-situ metrology equipment. In another example, metrology equipment 127 can be coupled to another station of manufacturing equipment 124. For example, metrology equipment can be coupled to a transfer chamber, such as transfer chamber 310 of FIG. 3, a load lock, such as load lock 320, or a factory interface, such as factory interface 306.

The client device 120 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data can be received from the client device 120. Client device 120 can display a graphical user interface (GUI), where the GUI enables the user to provide, as input, metrology measurement values for substrates processed at the manufacturing system. The client device 120 can include a corrective action component 122. Corrective action component 122 can receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data) from the predictive system 110, determines a corrective action based on the output, and causes the corrective action to be implemented. In some embodiments, the corrective action component 122 receives an indication of a corrective action from the predictive system 110 and causes the corrective action to be implemented. Each client device 120 can include an operating system that allows users to one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store can also store spectral data or non-spectral data associated with a portion of a substrate processed at manufacturing equipment 124. Spectral data can include historical spectral data and/or current spectral data.

Data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a process chamber.

Data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

Figure 5A:
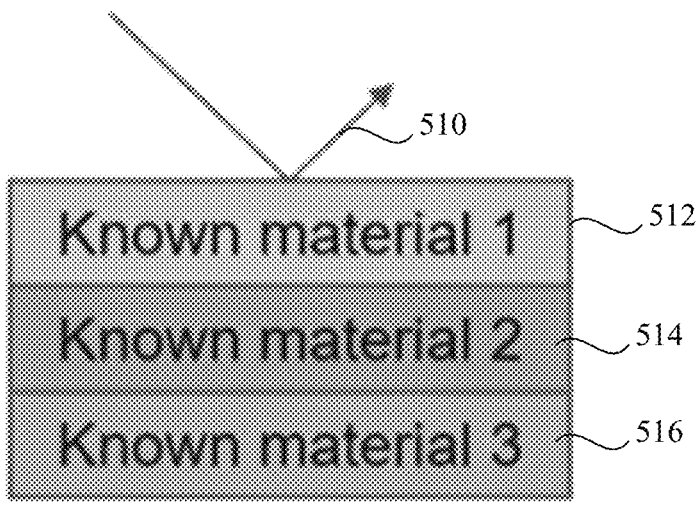
FIG. 5A is block diagram showing an example of unpatterned reflectance data, according to certain embodiments.

Data store 140 can also store sensor and/or metrology data. In some embodiments, the sensor data include unpatterned reflectance data 142 associated with the reflectance properties of film. Unpatterned reflectance data 142 can include a reflectance value for each film layer of a particular known thickness and of a particular known material. Unpatterned reflectance data 142 can also include a reflectance value for sets of film layers, where each layer is of a particular known thickness and of a particular known material. For example, unpatterned reflectance data 142 can include a reflectance value of a film stack of ten sets of alternating layers of oxide and nitride layers, where each oxide layer is of a first thickness and each nitride layer is of a second thickness. Unpatterned reflectance data 142 can further identify, for each reflectance value, the thickness and/or the material of each associated layer. FIG. 5A is block diagram showing an example of unpatterned reflectance data 142, according to certain embodiments. In particular, the unpatterned reflectance data includes a reflective value 510 of a film stack having three different materials of known thicknesses (e.g., known material 1 (512), known material 2 (514), and known material 3 (516)).

Figure 5B:
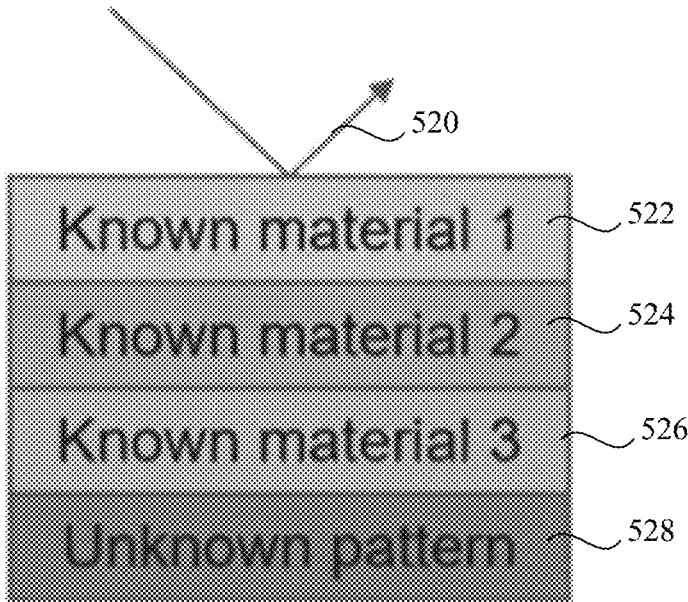
FIG. 5B is block diagram showing an example of patterned reflectance data, according to certain embodiments.

In some embodiments, the sensor data include patterned reflectance data 144. Patterned reflectance data 144 can include reflectance data of a film stack having, at least in part, an unknown pattern. An unknown pattern can reference a portion of a film stack whose film properties (e.g., number of layers, the thickness of each layer, the material of each layer, etc.) are unknown. In some embodiments, patterned reflectance data 144 can include one or more unknown patterns and one or more known patterns. A known pattern can reference a portion of a film stack whose film properties (e.g., number of layers, the thickness of each layer, the material of each layer, etc.) are known. FIG. 5B is block diagram showing an example of patterned reflectance data 144, according to certain embodiments. In particular, the reflectance data includes a reflective value 520 of a film stack having three different materials of known thicknesses (e.g., known material 1 (522), known material 2 (524), and known material 3 (526)), and an unknown pattern (e.g., unknown pattern 528).

In some embodiments, data store 140 can also store film thickness data (e.g., a film thickness profile) associated with one or more film layers. A film thickness profile refers to a particular thickness gradient of deposited film (e.g., changes in the thickness along a layer of deposited film). In some embodiments, the film thickness profile can include a thickness value of a film stack (e.g., multiple layers of one or more materials) deposited on a surface of a substrate (e.g., as determined by metrology inspection or as determined by prediction using, for example, a physics engine). For example, the film thickness profile can include a thickness value(s) of an ONON stack, an OPOP stack, an aggregated stack (e.g., an aggregated oxide stack, an aggregated nitride stack, an aggregated polysilicon stack etc.), or any other film stack generated by the manufacturing equipment 124 or by a simulation model. An aggregated stack can include thickness data associated with layers of a single material from a film stack having multiple layers of different materials. For example, from an ONON stack, an aggregated oxide stack can include thickness data from only the oxide layers, and an aggregated nitride stack can include thickness data from only the nitride layers.

In some embodiments, data store 140 can store expected profiles and corrections profiles. An expected profile can include one or more data points associated with a desired film profile expected to be produced by a certain process recipe. In some embodiments, an expected profile can include the desired thickness of the film. The correction profile can include one or more adjustments or offsets to be applied to the parameters of the process chamber or the process recipe. For example, the correction profile can include an adjustment to the temperature setting for the process chamber, the pressure setting for the process chamber, the flow rate setting for a precursor for a material included in the film deposited on the substrate surface, to the power supplied to the process chamber, to the ratio of two or more settings, etc. The correction profiles can be generated by comparing the expected profile (e.g., the thickness profile expected to be generated by the process recipe), and determining, using a library of known fault patterns and/or an algorithm, the adjustment to be applied to the parameters of the process recipe to achieve the expected profile. The correction profiles can be applied to steps associated with the deposition process, the etch process, etc.

In some embodiments, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some embodiments, all data stored at data store 140 can be inaccessible by the user of the manufacturing system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores.

In some embodiments, data store 140 can be configured to store data associated with known fault patterns. A fault pattern can be a one or more values (e.g., a vector, a scalar, etc.) associated with one or more issues or failures associated with a process chamber sub-system. In some embodiments, a fault pattern can be associated with a corrective action. For example, a fault pattern can include parameter adjustment steps to correct the issue or failure indicated by the fault pattern. For example, the predictive system can compare a determined fault pattern to a library of known fault patterns to determine the type of failure experienced by a sub-system, the cause of the failure, the recommended corrective action to correct the fault, and so forth.

In some embodiments, predictive system 110 includes predictive server 112, server machine 170 and server machine 180. The predictive server 112, server machine 170, and server machine 180 can each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 170 includes a training set generator 172 that is capable of generating training data sets (e.g., a set of data inputs and a set of target outputs) to train, validate, and/or test a machine-learning model 190, 192. Machine-learning model 190, 192 can be any algorithmic model capable of learning from data. In some embodiments, machine-learning model 190 can be a mapping model and machine-learning model 192 can be a predictive model. Some operations of data set generator 172 is described in detail below with respect to FIG. 2A-2B. In some embodiments, the data set generator 172 can partition the training data into a training set, a validating set, and a testing set. In some embodiments, the predictive system 110 generates multiple sets of training data.

Server machine 180 can include a training engine 182, a validation engine 184, a selection engine 185, and/or a testing engine 186. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training one or more machine-learning models 190, 192. Machine-learning model 190, 192 can refer to the model artifact that is created by the training engine 182 using the training data (also referred to herein as a training set) that includes training inputs and corresponding target outputs (correct answers for respective training inputs). The training engine 182 can find patterns in the training data that map the training input to the target output (the answer to be predicted), and provide the machine-learning model 190, 192 that captures these patterns. The machine-learning model 190, 192 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

One type of machine learning model that can be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities can be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks can learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a plasma process tuning, for example, the raw input can be process result profiles (e.g., thickness profiles indicative of one or more thickness values across a surface of a substrate); the second layer can compose feature data associated with a status of one or more zones of controlled elements of a plasma process system (e.g., orientation of zones, plasma exposure duration, etc.); the third layer can include a starting recipe (e.g., a recipe used as a starting point for determining an updated process recipe the process a substrate to generate a process result the meets threshold criteria). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs can be that of the network and can be the number of hidden layers plus one. For recurrent neural networks, in which a signal can propagate through a layer more than once, the CAP depth is potentially unlimited.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future flow rate measurements and make predictions based on this continuous metrology information. RNNs can be trained using a training dataset to generate a fixed number of outputs (e.g., to determine a set of substrate processing rates, determine modification to a substrate process recipe). One type of RNN that can be used is a long short term memory (LSTM) neural network.

Training of a neural network can be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset.

A training dataset containing hundreds, thousands, tens of thousands, hundreds of thousands or more sensor data and/or process result data (e.g., metrology data such as one or more thickness profiles associated with the sensor data) can be used to form a training dataset.

To effectuate training, processing logic can input the training dataset(s) into one or more untrained machine learning models. Prior to inputting a first input into a machine learning model, the machine learning model can be initialized. Processing logic trains the untrained machine learning model(s) based on the training dataset(s) to generate one or more trained machine learning models that perform various operations as set forth above. Training can be performed by inputting one or more of the sensor data into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences. For example, an output prediction or inference can include one or more predictions of film buildup on chamber components, erosion of chamber components, predicted failure of chamber components, and so on. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy can be, for example, 70%, 80% or 90% accuracy. In one embodiment, the stopping criterion is met if accuracy of the machine learning model has stopped improving. If the stopping criterion has not been met, further training is performed. If the stopping criterion has been met, training can be complete. Once the machine learning model is trained, a reserved portion of the training dataset can be used to test the model.

Once one or more trained machine learning models 190, 192 are generated, they can be stored in predictive server 112 as predictive component 114 or as a component of predictive component 114.

The validation engine 184 can be capable of validating machine-learning model 190, 192 using a corresponding set of features of a validation set from training set generator 172. Once the model parameters have been optimized, model validation can be performed to determine whether the model has improved and to determine a current accuracy of the deep learning model. The validation engine 184 can determine an accuracy of machine-learning model 190 based on the corresponding sets of features of the validation set. The validation engine 184 can discard a trained machine-learning model 190 that has an accuracy that does not meet a threshold accuracy. In some embodiments, the selection engine 185 can be capable of selecting a trained machine-learning model 190 that has an accuracy that meets a threshold accuracy. In some embodiments, the selection engine 185 can be capable of selecting the trained machine-learning model 190 that has the highest accuracy of the trained machine-learning models 190.

The testing engine 186 can be capable of testing a trained machine-learning model 190 using a corresponding set of features of a testing set from data set generator 172. For example, a first trained machine-learning model 190, 192 that was trained using a first set of features of the training set can be tested using the first set of features of the testing set. The testing engine 186 can determine a trained machine-learning model 190, 192 that has the highest accuracy of all of the trained machine-learning models based on the testing sets.

As described in detail below, predictive server 112 includes a predictive component 114 that is capable of providing data indicative of the expected behavior of each sub-system of a process chamber, and running trained machine-learning model 190, 192 on the current sensor data input to obtain one or more outputs. The predictive server 112 can further provide data indicative of the health of the process chamber sub-system and diagnostics. This will be explained in further detail below.

The client device 120, manufacturing equipment 124, sensors 126, metrology equipment 128, predictive server 112, data store 140, server machine 170, and server machine 180 can be coupled to each other via a network 130. In some embodiments, network 130 is a public network that provides client device 120 with access to predictive server 112, data store 140, and other publically available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, can be provided by a fewer number of machines. For example, in some embodiments, server machines 170 and 180 can be integrated into a single machine, while in some other or similar embodiments, server machines 170 and 180, as well as predictive server 112, can be integrated into a single machine.

In general, functions described in one implementation as being performed by server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

FIG. 2A is a flow chart of a method 200A for training a mapping machine-learning model, according to aspects of the present disclosure. Method 200A is performed by processing logic that can include hardware (circuitry, dedicated logic, etc.), software (such as is run on a general purpose computer system or a dedicated machine), firmware, or some combination thereof. In one implementation, method 200A can be performed by a computer system, such as computer system architecture 100 of FIG. 1. In other or similar implementations, one or more operations of method 200A can be performed by one or more other machines not depicted in the figures. In some aspects, one or more operations of method 200A can be performed by server machine 170, server machine 180, and/or predictive server 112.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, processing logic initializes a training set T to an empty set (e.g., { }).

At operation 212, processing logic obtains a first set of sensor data (e.g., sensor values, features, trace data) associated with a prior deposition process performed to deposit one or more layers of film on a surface of a prior substrate. A prior film stack generated by the prior deposition process can include one or more known patterns (e.g., the film properties of the pattern(s) is known) and one or more unknown patterns (e.g., the film properties of the pattern(s) is unknown).

In some embodiments, the sensor data can include patterned reflectance data (e.g., patterned reflectance data 144). The patterned reflectance data can include a reflectance value of a film stack having one or more unknown patterns and one or more known patterns. In some embodiments, the patterned reflectance data can be retrieved from data store 140.

In some embodiments, the sensor data associated with the deposition process is historical data associated with one or more prior deposition settings for a prior deposition process previously performed for a prior substrate at a manufacturing system. For example, the historical data can be historical contextual data associated with the prior deposition process stored at data store 140. In some embodiments, the one or more prior deposition settings can include at least one of a prior temperature setting for the prior deposition process, a prior pressure setting for the prior deposition setting, a prior flow rate setting for a precursor for one or more material of the prior film deposited on the surface of the prior substrate, or any other setting associated with the deposition process. A flow rate setting can refer to a flow rate setting for the precursor at an initial instance of the prior deposition process (referred to as an initial flow rate setting), a flow rate setting for the precursor at a final instance of the prior deposition process (referred to as a final flow rate setting), or a ramping rate for the flow rate of the precursor during the deposition process. In one example, the precursor for the prior film can include a boron-containing precursor or a silicon-containing precursor.

At operation 214, processing logic can obtain a second set of sensor data associated with the known pattern portion of the prior film stack deposited on the surface of the prior substrate. In some embodiments, the second set of sensor data can include unpatterned reflectance data (e.g., unpatterned reflectance data 142). The unpatterned reflectance data can include a reflectance value of a film stack having similar or the same known pattern as that of the prior film stack. In some embodiments, the unpatterned reflectance data can be retrieved, by the processing logic, from data store 140. In some embodiments, processing logic can generate the unpatterned reflectance data using a physics engine, a simulation model, or any other system capable of generating reflectance data for one or more film layers having known physical properties. In some embodiments, the second set of sensor data can include sensor data associated with one or more prior deposition settings, such as a prior temperature setting for the prior deposition process, a prior pressure setting for the prior deposition setting, a prior flow rate setting for a precursor for one or more material of the prior film deposited on the surface of the prior substrate, or any other setting associated with the deposition process.

At operation 216, processing logic generates first training data based on the obtained first sensor data. At operation 218, processing logic generates second training data based on the second sensor data.

At operation 220, processing logic generates a mapping between the first training data and the second training data. The mapping refers to the first training data that includes or is based on the sensor data for the prior deposition process performed for the prior substrate (e.g., patterned reflectance data) and the second training data that includes or is based on sensor data associated with the known pattern portion of the prior film stack deposited on the surface of the prior substrate (e.g., unpatterned reflectance data), where the first training data is associated with (or mapped to) the second training data. At operation 222, processing logic adds the mapping to the training set T.

At operation 226, processing logic determines whether the training set, T, includes a sufficient amount of training data to train a machine-learning model (e.g., mapping model 190). It should be noted that in some implementations, the sufficiency of training set T can be determined based simply on the number of mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set does not include a sufficient amount of training data to train the machine-learning model, method 200A returns to operation 212. Responsive to determining the training set T includes a sufficient amount of training data to train the machine-learning model, method 200A continues to operation 228.

At operation 228, processing logic provides the training set T to train the mapping model. In one implementation, the training set T is provided to training engine 182 of server machine 180 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T.

In some embodiments, the processing logic can perform outlier detection methods to remove anomalies from the training set T prior to training the machine-learning model. Outlier detection methods can include techniques that identify values that differ significantly from the majority the training data. These values can be generated from errors, noise, etc.

After operation 228, the mapping model can receive reflectance data of a patterned substrate and output a value indicative of reflectance data of the only the known pattern of the patterned substrate.

FIG. 2B is a flow chart of a method 200B for training a prediction machine-learning model, according to aspects of the present disclosure. Method 200B is performed by processing logic that can include hardware (circuitry, dedicated logic, etc.), software (such as is run on a general purpose computer system or a dedicated machine), firmware, or some combination thereof. In one implementation, method 200B can be performed by a computer system, such as computer system architecture 100 of FIG. 1. In other or similar implementations, one or more operations of method 200B can be performed by one or more other machines not depicted in the figures. In some aspects, one or more operations of method 200B can be performed by server machine 170, server machine 180, and/or predictive server 112.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 240, processing logic initializes a training set T to an empty set (e.g., { }).

At operation 242, processing logic obtains sensor data associated with one or more film layers. The sensor data can include data associated with a known pattern portion of prior film deposited on the surface of the prior substrate. In some embodiments, the sensor data can include unpatterned reflectance data (e.g., unpatterned reflectance data 142). The unpatterned reflectance data can include a reflectance value of a film stack having a known pattern. In some embodiments, the unpatterned reflectance data can be retrieved, by the processing logic, from data store 140. In some embodiments, processing logic can generate the unpatterned reflectance data using a physics engine, a simulation model, or any other system capable of generating reflectance data for one or more film layers having known physical properties. In some embodiments, the sensor data can include sensor data associated with one or more prior deposition settings, such as a prior temperature setting for the prior deposition process, a prior pressure setting for the prior deposition setting, a prior flow rate setting for a precursor for one or more material of the prior film deposited on the surface of the prior substrate, or any other setting associated with the deposition process At operation 244, processing logic obtains film property data associated with the one or more film layers. The film property data can include spatial film properties, dimensions (e.g., thickness, height, etc.), dielectric constant, dopant concentration, density, defects, etc. In some embodiments, the film property data can include a film thickness profile associated with one or more film layers. Processing logic can obtain the film property data from data store 140, in accordance with previously described embodiments. In some embodiments, processing logic can generate using a physics engine, a simulation model, or any other system capable of generating film property data for one or more film layers.

At operation 246, processing logic generates first training data based on the sensor data obtained at operation 242. At operation 248, processing logic generates second training data based on the film property data obtained at operation 244.

At operation 250, processing logic generates a mapping between the first training data and the second training data. The mapping refers to the first training data that includes or is based on data for the sensor data (e.g., unpatterned reflectance data) and the second training data that includes or is based on film property data (e.g., thickness data), where the first training data is associated with (or mapped to) the second training data. At operation 252, processing logic adds the mapping to the training set T.

At operation 256, processing logic determines whether the training set, T, includes a sufficient amount of training data to train a machine-learning model (e.g., predictive model 192). It should be noted that in some implementations, the sufficiency of training set T can be determined based simply on the number of mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set does not include a sufficient amount of training data to train the machine-learning model, method 200B returns to operation 242. Responsive to determining the training set T includes a sufficient amount of training data to train the machine-learning model, method 200B continues to operation 258.

At operation 258, processing logic provides the training set T to train the machine-learning model. In one implementation, the training set T is provided to training engine 182 of server machine 180 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T.

In some embodiments, the processing logic can perform outlier detection methods to remove anomalies from the training set T prior to training the machine-learning model. Outlier detection methods can include techniques that identify values that differ significantly from the majority the training data. These values can be generated from errors, noise, etc.

After operation 258, the predictive model can receive, as input, the unpatterned reflectance data (e.g., mapping model output data) and generate predictive data. In some embodiments, the predictive data can include thickness data or a thickness profile of one or more deposition layers.

Figure 6A:
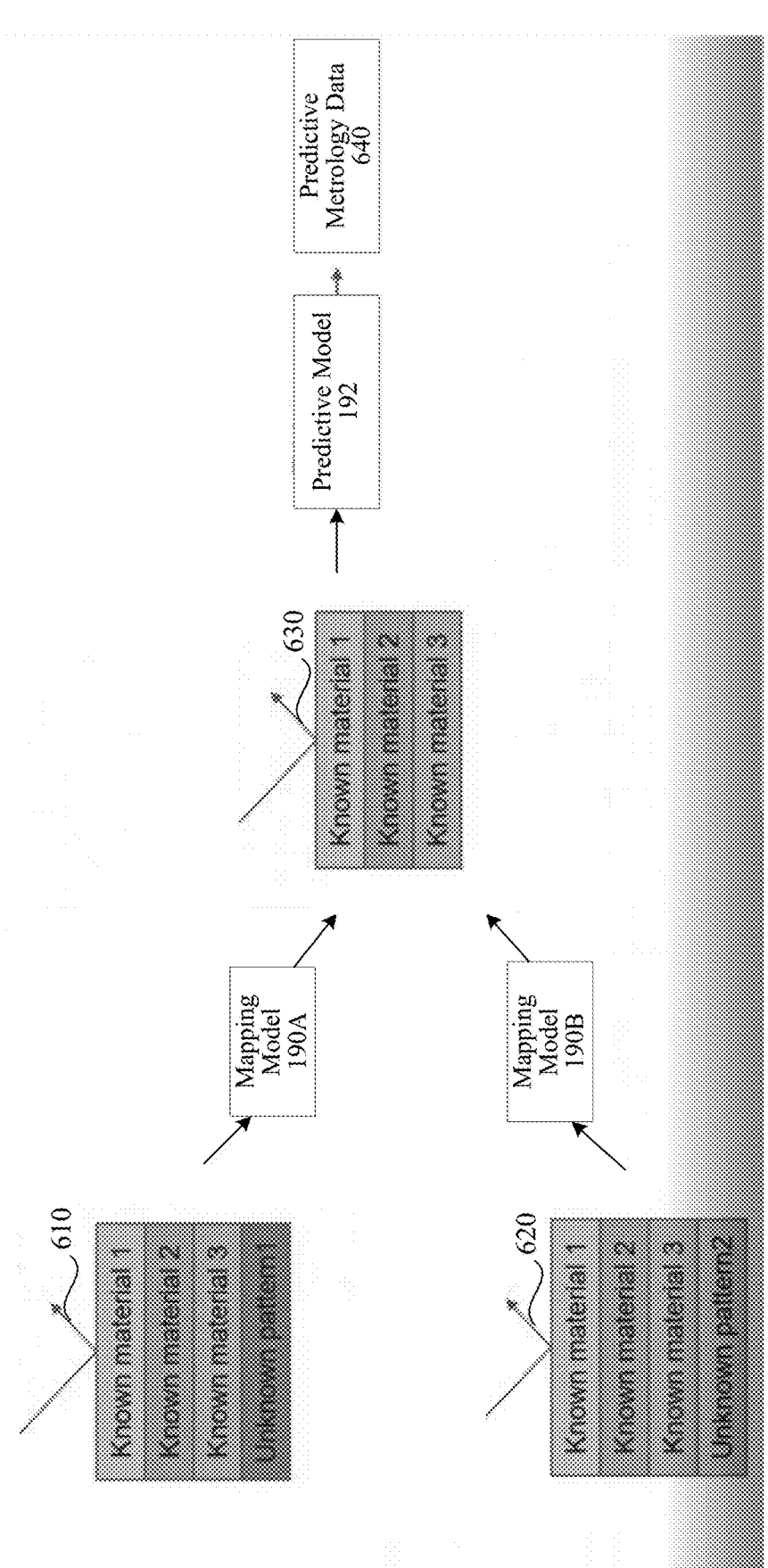
FIG. 6A is a block diagram illustrating generating different trained mapping models for different recipes having different unknown patterns, according to certain embodiments.

In some embodiments, predictive system 110 can generate different trained mapping models 190 for different recipes having different unknown patterns. FIG. 6A is a block diagram illustrating generating different trained mapping models 190 for different recipes having different unknown patterns, according to certain embodiments. As shown in FIG. 6A, predictive system 110 can train a first mapping model 190A and a second mapping model 190B using, for example, the operations discussed in FIG. 2A. The first mapping model 190A can receive, as input, patterned reflectance data 610 from a film stack having a first unknown pattern, and output unpatterned reflectance data 630. Similarly, the second mapping model 190B can receive, as input, patterned reflectance data 620 from a film stack having a second unknown pattern, and output unpatterned reflectance data 630. The unpatterned reflectance data 630 output from each mapping model 190A, 190B can be used as input for predictive model 192 to generate predictive metrology data 640 for each set of input data. In some embodiments, predictive metrology data 640 can be thickness data, such as a thickness profile.

Figure 6B:
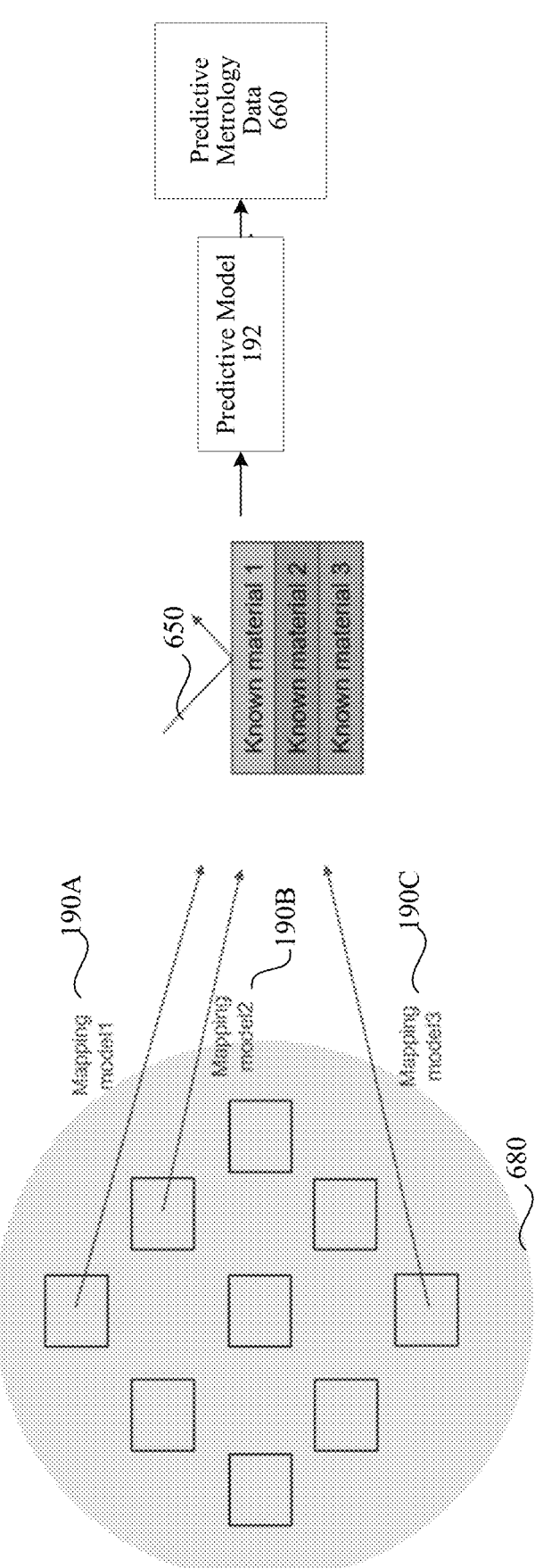
FIG. 6B is a block diagram illustrating generating different trained mapping models for different sections of a film stack having different unknown patterns, according to certain embodiments

In some embodiments, predictive system 110 can generate different trained mapping models 190 for different sections of the same film stack, where each section can have different unknown patterns. FIG. 6B is a block diagram illustrating generating different trained mapping models 190 for different sections of a film stack having different unknown patterns, according to certain embodiments. As shown in FIG. 6B, predictive system 110 can train a first mapping model 190A for a first section of film stack 680, can train a second mapping model 190B for a second section of film stack 680, can train a third mapping model 190C for a third section of film stack 680, and can train additional mapping models for other sections of film stack 680. The unpatterned reflectance data 650 output from each mapping model 190A, 190B, 190C can be used as input for predictive model 192 to generate predictive metrology data 640 for each set of input data. In some embodiments, predictive metrology data 660 can be thickness data, such as a thickness profile.

In some embodiments, a manufacturing system can include more than one process chambers. For example, example manufacturing system 300 of FIG. 3 illustrates multiple process chambers 314, 316, 318. It should be noted that, in some embodiments, data obtained to train the machine-learning model and data collected to be provided as input to the machine-learning model can be associated with the same process chamber of the manufacturing system. In other or similar embodiments, data obtained to train the machine-learning model and data collected to be provided as input to the machine-learning model can be associated with different process chambers of the manufacturing system. In other or similar embodiments, data obtained to train the machine-learning model can be associated with a process chamber of a first manufacturing system and data collected to be provide as input to the machine-learning model can be associated with a process chamber of a second manufacturing system.

FIG. 3 is a top schematic view of an example manufacturing system 300, according to aspects of the present disclosure. Manufacturing system 300 can perform one or more processes on a substrate 302. Substrate 302 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 300 can include a process tool 304 and a factory interface 306 coupled to process tool 304. Process tool 304 can include a housing 308 having a transfer chamber 310 therein. Transfer chamber 310 can include one or more process chambers (also referred to as processing chambers) 314, 316, 318 disposed therearound and coupled thereto. Process chambers 314, 316, 318 can be coupled to transfer chamber 310 through respective ports, such as slit valves or the like. Transfer chamber 310 can also include a transfer chamber robot 312 configured to transfer substrate 302 between process chambers 314, 316, 318, load lock 320, etc. Transfer chamber robot 312 can include one or multiple arms where each arm includes one or more end effectors at the end of each arm. The end effector can be configured to handle particular objects, such as wafers, sensor discs, sensor tools, etc.

Process chambers 314, 316, 318 can be adapted to carry out any number of processes on substrates 302. A same or different substrate process can take place in each processing chamber 314, 316, 318. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 314, 316, 318 can each include one or more sensors configured to capture data for substrate 302 before, after, or during a substrate process. For example, the one or more sensors can be configured to capture spectral data and/or non-spectral data for a portion of substrate 302 during a substrate process. In other or similar embodiments, the one or more sensors can be configured to capture data associated with the environment within process chamber 314, 316, 318 before, after, or during the substrate process. For example, the one or more sensors can be configured to capture data associated with a temperature, a pressure, a gas concentration, etc. of the environment within process chamber 314, 316, 318 during the substrate process.

In some embodiments, metrology equipment 128 (not shown) can be located within the process tool. In other embodiments, metrology equipment 128 (not shown) can be located within one or more process chambers 314, 316, 318. In some embodiments, the substrate can be placed onto metrology equipment 128 using transfer chamber robot 312. In other embodiments, the metrology equipment 128 can be part of the substrate support assembly (not shown). Metrology equipment 128 can use reflectometry techniques to obtain reflectance data of one or more deposition layers during or after a deposition process.

A load lock 320 can also be coupled to housing 308 and transfer chamber 310. Load lock 320 can be configured to interface with, and be coupled to, transfer chamber 310 on one side and factory interface 306. Load lock 320 can have an environmentally-controlled atmosphere that can be changed from a vacuum environment (wherein substrates can be transferred to and from transfer chamber 310) to an at or near atmospheric-pressure inert-gas environment (wherein substrates can be transferred to and from factory interface 306) in some embodiments. Factory interface 306 can be any suitable enclosure, such as, e.g., an Equipment Front End Module (EFEM). Factory interface 306 can be configured to receive substrates 302 from substrate carriers 322 (e.g., Front Opening Unified Pods (FOUPs)) docked at various load ports 324 of factory interface 306. A factory interface robot 326 (shown dotted) can be configured to transfer substrates 302 between carriers (also referred to as containers) 322 and load lock 320. Carriers 322 can be a substrate storage carrier or a replacement part storage carrier.

Manufacturing system 300 can also be connected to a client device (not shown) that is configured to provide information regarding manufacturing system 300 to a user (e.g., an operator). In some embodiments, the client device can provide information to a user of manufacturing system 300 via one or more graphical user interfaces (GUIs). For example, the client device can provide information regarding a target thickness profile for a film to be deposited on a surface of a substrate 302 during a deposition process performed at a process chamber 314, 316, 318 via a GUI. The client device can also provide information regarding a modification to a process recipe in view of a respective set of deposition settings predicted to correspond to the target profile, in accordance with embodiments described herein.

Manufacturing system 300 can also include a system controller 328. System controller 328 can be and/or include a computing device such as a personal computer, a server computer, a programmable logic controller (PLC), a microcontroller, and so on. System controller 328 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 328 can include a data storage device (e.g., one or more disk drives and/or solid state drives), a main memory, a static memory, a network interface, and/or other components. System controller 328 can execute instructions to perform any one or more of the methodologies and/or embodiments described herein. In some embodiments, system controller 328 can execute instructions to perform one or more operations at manufacturing system 300 in accordance with a process recipe. The instructions can be stored on a computer readable storage medium, which can include the main memory, static memory, secondary storage and/or processing device (during execution of the instructions).

System controller 328 can receive data from sensors included on or within various portions of manufacturing system 300 (e.g., processing chambers 314, 316, 318, transfer chamber 310, load lock 320, etc.). In some embodiments, data received by the system controller 328 can include spectral data and/or non-spectral data for a portion of substrate 302. In other or similar embodiments, data received by the system controller 328 can include data associated with processing substrate 302 at processing chamber 314, 316, 318, as described previously. For purposes of the present description, system controller 328 is described as receiving data from sensors included within process chambers 314, 316, 318. However, system controller 328 can receive data from any portion of manufacturing system 300 and can use data received from the portion in accordance with embodiments described herein. In an illustrative example, system controller 328 can receive data from one or more sensors for process chamber 314, 316, 318 before, after, or during a substrate process at the process chamber 314, 316, 318. Data received from sensors of the various portions of manufacturing system 300 can be stored in a data store 350. Data store 350 can be included as a component within system controller 328 or can be a separate component from system controller 328. In some embodiments, data store 350 can be data store 140 described with respect to FIG. 1.

FIG. 4 is a cross-sectional schematic side view of a process chamber 400, in accordance with embodiments of the present disclosure. In some embodiments, process chamber 400 can correspond to process chamber 314, 316, 318, described with respect to FIG. 3. Process chamber 400 can be used for processes in which a corrosive plasma environment is provided. For example, the process chamber 400 can be a chamber for a plasma etcher or plasma etch reactor, and so forth. In another example, process chamber can be a chamber for a deposition process, as previously described. In one embodiment, the process chamber 400 includes a chamber body 402 and a showerhead 430 that encloses an interior volume 406. The showerhead 430 can include a showerhead base and a showerhead gas distribution plate. Alternatively, the showerhead 430 can be replaced by a lid and a nozzle in some embodiments, or by multiple pie shaped showerhead compartments and plasma generation units in other embodiments. The chamber body 402 can be fabricated from aluminum, stainless steel or other suitable material such as titanium (Ti). The chamber body 402 generally includes sidewalls 408 and a bottom 410. An exhaust port 426 can be defined in the chamber body 402, and can couple the interior volume 406 to a pump system 428. The pump system 428 can include one or more pumps and throttle valves utilized to evacuate and regulate the pressure of the interior volume 406 of the process chamber 400.

The showerhead 430 can be supported on the sidewall 408 of the chamber body 402. The showerhead 420 (or lid) can be opened to allow access to the interior volume 406 of the process chamber 400, and can provide a seal for the process chamber 400 while closed. A gas panel 458 can be coupled to the process chamber 400 to provide process and/or cleaning gases to the interior volume 406 through the showerhead 430 or lid and nozzle (e.g., through apertures of the showerhead or lid and nozzle). For example. gas panel 458 can provide precursors for materials of a film 451 deposited on a surface of a substrate 302. In some embodiments, a precursor can include a silicon-based precursor or a boron-based precursor. The showerhead 430 can include a gas distribution plate (GDP) and can have multiple gas delivery holes 432 (also referred to as channels) throughout the GDP. A substrate support assembly 448 is disposed in the interior volume 406 of the process chamber 400 below the showerhead 430. The substrate support assembly 448 holds a substrate 302 during processing (e.g., during a deposition process) using, for example, electrostatic chuck 450.

In some embodiments, processing chamber 400 can include metrology equipment (not shown) configured to generate in-situ metrology measurements during a process performed at process chamber 400. The metrology equipment can be operatively coupled to the system controller (e.g., system controller 328, as previously described). In some embodiments, the metrology equipment can be configured to generate a metrology measurement value (e.g., a thickness) for film 451 during particular instances of the deposition process. The system controller can generate a thickness profile for film 451 based on the received metrology measurement values from the metrology equipment. In other or similar embodiments, processing chamber 400 does not include metrology equipment. In such embodiments, the system controller can receive one or more metrology measurement values for film 451 after completion of the deposition process at process chamber 400. System controller can determine a deposition rate based on the one or more metrology measurement values and can associate generate the thickness profile for film 451 based on the determined concentration gradient and the determined deposition rate of the deposition process.

FIG. 7 is a flow chart of a method 700 for determining predictive metrology data for layers of a film using a mapping model and a predictive model, according to aspects of the present disclosure. Method 700 is performed by processing logic that can include hardware (circuitry, dedicated logic, etc.), software (such as is run on a general purpose computer system or a dedicated machine), firmware, or some combination thereof. In one implementation, method 700 can be performed by a computer system, such as computer system architecture 100 of FIG. 1. In other or similar implementations, one or more operations of method 700 can be performed by one or more other machines not depicted in the figures. In some aspects, one or more operations of method 700 can be performed by server machine 170, server machine 180, and/or predictive server 112.

At operation 710, processing logic obtains one or more sensor values associated with a deposition process performed in a process chamber to deposit one or more layers of film on a surface of a substrate. In some embodiments, the one or more sensor values can include reflectance data of a patterned substrate (e.g., a substrate having a known film pattern and an unknown film pattern).

At operation 712, processing logic applies a mapping model to the plurality of sensor values. For example, the processing logic can input the one or more sensor value into the mapping model (e.g., mapping model 190). In some embodiments, mapping model 190 can be trained using method 200A.

At operation 714, processing logic obtains an output of the mapping model. In some embodiments, the mapping model output can identify a value(s) indicative of the reflectance data of only the known pattern of the patterned substrate.

At operation 716, processing logic applies a predictive model to the mapping model output. For example, the processing logic can input the mapping model output (value(s) indicative of the reflectance data of only the known pattern of the patterned substrate) into the predictive model (e.g., predictive model 192). In some embodiments, predictive model 192 can be trained using method 200B.

At operation 718, processing logic obtains an output of the predictive model. In some embodiments, the predictive model output can identify predictive metrology data for one or more layers of film. In some embodiments, the predictive metrology data includes a thickness profile. For example, the predictive metrology data can include a contour map having a set of spatial measurements, each spatial measurement indicating a thickness of a particular location of a plurality of locations on one or more layers on the substrate. In some embodiments, the predictive metrology data indicates an average predictive layer thickness.

FIG. 8 is a flow chart of a method 800 for determining a correction profile for a process recipe, according to aspects of the present disclosure. Method 800 is performed by processing logic that can include hardware (circuitry, dedicated logic, etc.), software (such as is run on a general purpose computer system or a dedicated machine), firmware, or some combination thereof. In one implementation, method 800 can be performed by a computer system, such as computer system architecture 100 of FIG. 1. In other or similar implementations, one or more operations of method 800 can be performed by one or more other machines not depicted in the figures. In some aspects, one or more operations of method 800 can be performed by manufacturing equipment 124 and/or client device 122.

At operation 810, the processing logic performs a deposition process on a substrate according to a process recipe. The deposition process can be performed in one or more process chambers. The process recipe can include one or more setting parameters for the deposition process. For example, the setting parameters can include a temperature setting for the process chamber, a pressure setting for the process chamber, a flow rate setting for a precursor for a material included in the film deposited on the substrate surface, a showerhead height, etc. The deposition process can deposit multiple layers on the substrate. For example, the deposition process can deposit alternating layers of oxide and nitride layers, alternating oxide and polysilicon layers, etc.

At operation 812, the processing logic generates metrology data associated with the deposited film. The metrology data can be generated using the mapping model and the predictive model. The metrology data can include a value of film property data (e.g., wafer spatial film properties), dimensions (e.g., thickness, height, etc.), dielectric constant, dopant concentration, density, defects, etc. In some embodiments the metrology data can include a thickness profile indicative of the thickness of one or more layers of the film.

At operation 814, the processing logic generates a correction profile based on the metrology data. The correction profile can include one or more corrective actions to be applied to the parameters of the process recipe or the process chamber. For example, the correction profile can include an adjustment to the temperature setting for the process chamber, the pressure setting for the process chamber, the flow rate setting for a precursor for a material included in the film deposited on the substrate surface, to the power supplied to the process chamber, to the ratio of two or more settings, etc. In some embodiments, the processing logic can generate the correction profile(s) by determining a delta (difference) between an expected profile (e.g., the thickness profile expected to be generated by the process recipe) and the thickness profile generated by the metrology equipment. The processing logic can then generate the correction profile by applying an algorithm to the delta and/or looking up the delta in a library of known faults. For example, the library can include a list of delta correlating to specific correction profiles.

At operation 816, the processing logic generates an updated process recipe by applying the correction profile to the process recipe. For example, the correction profile can be applied to one or more steps of the current deposition process.

At operation 818, the processing logic performs, on the substrate, a subsequent step of the process recipe according to the updated process recipe. In some embodiments, the subsequent step comprises another deposition step. In some embodiments, the update process recipe can be used to perform additional deposition steps on the substrate. For example, the processing logic can deposit a first set of film layers on the substrate, determine the thickness profile of the deposited film, generate a correction profile to correct any faults detected during the deposition of the first set of film layers, apply the correction profile to the process recipe, and deposit a second set of film layers on the substrate. Accordingly, the deposition process recipe can be adjusted in real or near real-time.

Figure 9:
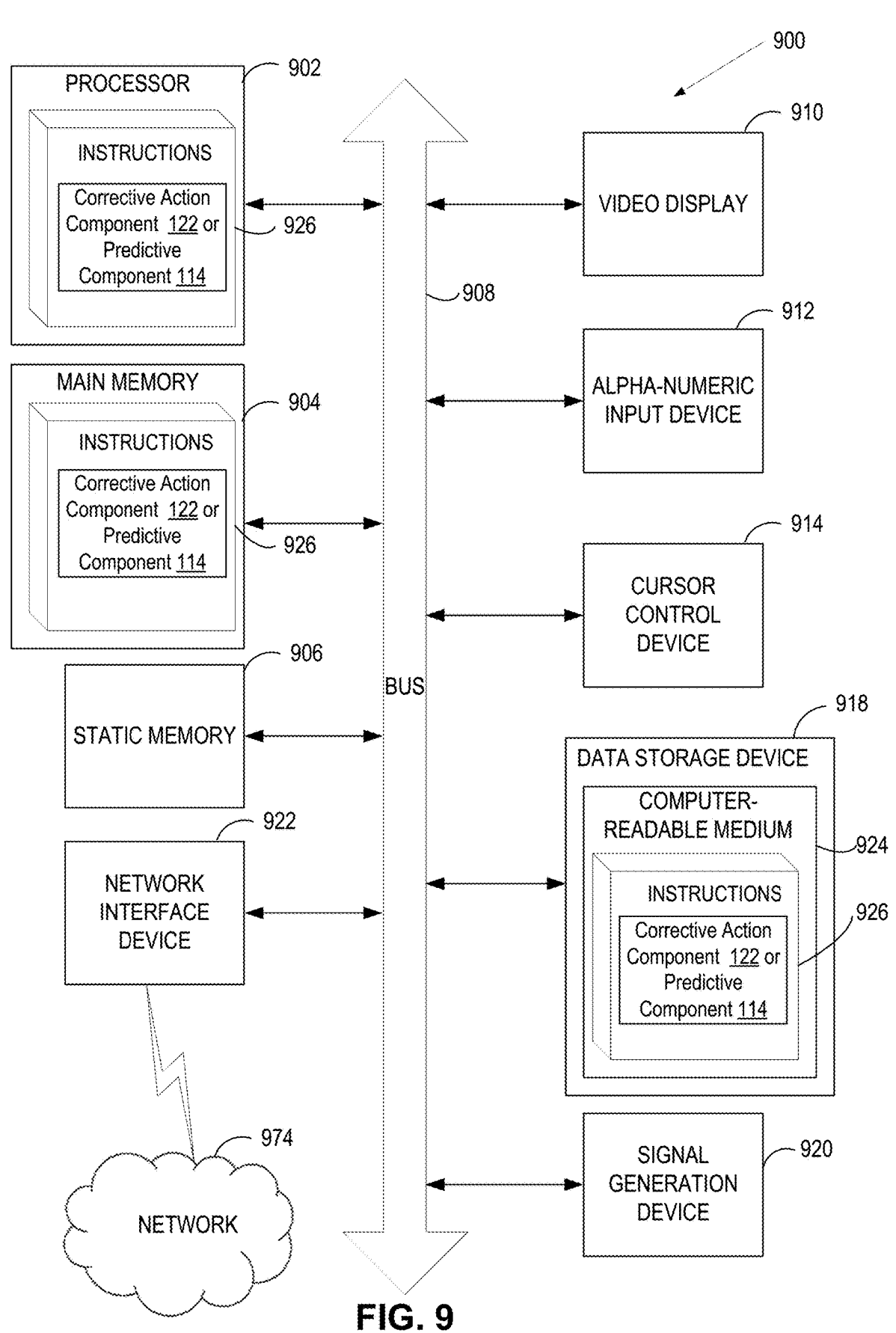
FIG. 9 is a block diagram illustrating a computer system, according to certain embodiments.

FIG. 9 is a block diagram illustrating a computer system 900, according to certain embodiments. In some embodiments, computer system 900 can be connected (e.g., via a network, such as a Local Area Network (LAN), an intranet, an extranet, or the Internet) to other computer systems. Computer system 900 can operate in the capacity of a server or a client computer in a client-server environment, or as a peer computer in a peer-to-peer or distributed network environment. Computer system 900 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 can include a processing device 902, a volatile memory 904 (e.g., Random Access Memory (RAM)), a non-volatile memory 906 (e.g., Read-Only Memory (ROM) or Electrically-Erasable Programmable ROM (EEPROM)), and a data storage device 916, which can communicate with each other via a bus 908.

Processing device 902 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 900 can further include a network interface device 922 (e.g., coupled to network 974). Computer system 900 also can include a video display unit 910 (e.g., an LCD), an alphanumeric input device 912 (e.g., a keyboard), a cursor control device 914 (e.g., a mouse), and a signal generation device 920.

In some implementations, data storage device 916 can include a non-transitory computer-readable storage medium 924 on which can store instructions 926 encoding any one or more of the methods or functions described herein, including instructions encoding components of FIG. 1 (e.g., corrective action component 122, predictive component 114, etc.) and for implementing methods described herein.

Instructions 926 can also reside, completely or partially, within volatile memory 904 and/or within processing device 902 during execution thereof by computer system 900, hence, volatile memory 904 and processing device 902 can also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and can not have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   obtaining, by a processor, sensor data associated with a deposition process performed in a process chamber to deposit a film stack on a surface of a substrate, wherein the film stack comprises a known film pattern and an unknown film pattern;
   inputting the sensor data into a first trained machine-learning model;
   obtaining a first output value of the first trained machine-learning model, the first output value being associated with the known film pattern;

inputting the first output value into a second trained machine-learning model;

obtaining a second output value of the second trained machine-learning model, the second output value being indicative of metrology data of the known film pattern;

generating a correction profile based on the metrology data;

generating an updated process recipe by applying the correction profile to the process recipe; and causing a deposition process to be performed according to the updated process recipe.

2. The method of claim 1, wherein the sensor data comprises reflectance data associated with the film stack.

3. The method of claim 1, wherein training the first trained machine- learning model comprises:

obtaining first sensor data associated with a first reflectance value of a film stack comprising a first set of film layers having a known film pattern and a second set of film layers having an unknown film pattern;

obtaining second sensor data indicative of a second reflectance value associated with the first set of film layers; and training an untrained machine-learning model based on the first sensor data and the second sensor data, wherein the untrained machine-learning model is trained to generate predictive reflectance data.

4. The method of claim 1, wherein training the second trained machine-learning model comprises:

obtaining sensor data associated with a reflectance value of a film stack comprising a set of film layers having a known film pattern;

obtaining film property data associated with the set of film layers, wherein the film property data comprises thickness data; and training an untrained machine-learning model based on the sensor data and the film property data, wherein the untrained machine-learning model is trained to generate predictive metrology data.

5. The method of claim 1, wherein the metrology data comprises thickness data.

6. The method of claim 1, further comprising:

obtaining further sensor data associated with a different section of the film stack, wherein the different section comprises a different unknown film pattern;

inputting the further sensor data into a third trained machine-learning model;

obtaining a third output value of the third trained machine-learning model, the third output value being associated with the known film pattern;

inputting the third output value into the second trained machine-learning model; and obtaining a fourth output value of the second trained machine-learning model, the fourth output value being indicative of metrology data of the known film pattern.

7. An electronic device manufacturing system, comprising:

a memory device; and a processing device, operatively coupled to the memory device, to perform operations comprising:

obtaining sensor data associated with a deposition process performed in a process chamber to deposit a film stack on a surface of a substrate, wherein the film stack comprises a known film pattern and an unknown film pattern;

inputting the sensor data into a first trained machine-learning model;

obtaining a first output value of the first trained machine-learning model, the first output value being associated with the known film pattern;

inputting the first output value into a second trained machine-learning model;

obtaining a second output value of the second trained machine-learning model, the second output value being indicative of metrology data of the known film pattern generating a correction profile based on the metrology data;

generating an updated process recipe by applying the correction profile to the process recipe; and causing a deposition process to be performed according to the updated process recipe.

8. The electronic device manufacturing system of claim 7, wherein the sensor data comprises reflectance data associated with the film stack.

9. The electronic device manufacturing system of claim 7, wherein training the first trained machine-learning model comprises the processing device performing operations comprising:

obtaining first sensor data associated with a first reflectance value of a film stack comprising a first set of film layers having a known film pattern and a second set of film layers having an unknown film pattern;

obtaining second sensor data indicative of a second reflectance value associated with the first set of film layers; and training an untrained machine-learning model based on the first sensor data and the second sensor data, wherein the untrained machine-learning model is trained to generate predictive reflectance data.

10. The electronic device manufacturing system of claim 7, wherein training the second trained machine-learning model comprises the processing device performing operations comprising:

obtaining sensor data associated with a reflectance value of a film stack comprising a set of film layers having a known film pattern;

obtaining film property data associated with the set of film layers, wherein the film property data comprises thickness data; and training an untrained machine-learning model based on the sensor data and the film property data, wherein the untrained machine-learning model is trained to generate predictive metrology data.

11. The electronic device manufacturing system of claim 7, wherein the metrology data comprises thickness data.

12. The electronic device manufacturing system of claim 7, wherein the processing device is further to perform operations comprising:

obtaining further sensor data associated with a different section of the film stack, wherein the different section comprises a different unknown film pattern;

inputting the further sensor data into a third trained machine-learning model;

obtaining a third output value of the third trained machine-learning model, the third output value being associated with the known film pattern;

inputting the third output value into the second trained machine-learning model; and obtaining a fourth output value of the second trained machine-learning model, the fourth output value being indicative of metrology data of the known film pattern.

13. A non-transitory computer-readable storage medium comprising instructions that, when executed by a processing device operatively coupled to a memory, performs operations comprising:

obtaining sensor data associated with a deposition process performed in a process chamber to deposit a film stack on a surface of a substrate, wherein the film stack comprises a known film pattern and an unknown film pattern;

inputting the sensor data into a first trained machine-learning model;

obtaining a first output value of the first trained machine-learning model, the first output value being associated with the known film pattern;

inputting the first output value into a second trained machine-learning model;

obtaining a second output value of the second trained machine-learning model, the second output value being indicative of metrology data of the known film pattern generating a correction profile based on the metrology data;

generating an updated process recipe by applying the correction profile to the process recipe; and causing a deposition process to be performed according to the updated process recipe.

14. The non-transitory computer-readable storage medium of claim 13, wherein the sensor data comprises reflectance data associated with the film stack, and wherein the metrology data comprises thickness data.

15. The non-transitory computer-readable storage medium of claim 13, wherein training the first trained machine-learning model comprises the processing device perform operations comprising:

obtaining first sensor data associated with a first reflectance value of a film stack comprising a first set of film layers having a known film pattern and a second set of film layers having an unknown film pattern;

obtaining second sensor data indicative of a second reflectance value associated with the first set of film layers; and training an untrained machine-learning model based on the first sensor data and the second sensor data, wherein the untrained machine-learning model is trained to generate predictive reflectance data.

16. The non-transitory computer-readable storage medium of claim 13, wherein training the second trained machine-learning model comprises the processing device perform operations comprising:

obtaining sensor data associated with a reflectance value of a film stack comprising a set of film layers having a known film pattern;

obtaining film property data associated with the set of film layers, wherein the film property data comprises thickness data; and training an untrained machine-learning model based on the sensor data and the film property data, wherein the untrained machine-learning model is trained to generate predictive metrology data.

17. The non-transitory computer-readable storage medium of claim 13, wherein the processing device is further to perform operations comprising:

obtaining further sensor data associated with a different section of the film stack, wherein the different section comprises a different unknown film pattern;

inputting the further sensor data into a third trained machine-learning model;

obtaining a third output value of the third trained machine-learning model, the third output value being associated with the known film pattern;

inputting the third output value into the second trained machine-learning model; and obtaining a fourth output value of the second trained machine-learning model, the fourth output value being indicative of metrology data of the known film pattern.

* * * * *